US00RE34181E

United States Patent [19]

Smallwood

[11] E Patent Number: Re. 34,181

[45] Reissued Date of Patent: Feb. 16, 1993

[54] TREATMENT OF AQUEOUS SUSPENSION OF VINYL CHLORIDE POLYMERS

[75] Inventor: Peter V. Smallwood, Cheshire, England

[73] Assignee: Imperial Chemical Industries PLC, London, England

[21] Appl. No.: 683,069

[22] Filed: Apr. 10, 1991

Related U.S. Patent Documents

Reissue of:

[64] Patent No.: 4,604,419
Issued: Aug. 5, 1986
Appl. No.: 716,138
Filed: Mar. 26, 1985

[30] Foreign Application Priority Data

Apr. 17, 1984 [GB] United Kingdom ..... 8409962
Sep. 26, 1984 [GB] United Kingdom ..... 8424353

[51] Int. Cl.[5] ..... C08K 5/10
[52] U.S. Cl. ..... 524/312; 524/318
[58] Field of Search ..... 524/312, 318

[56] References Cited

U.S. PATENT DOCUMENTS 2,479,410 8/1949 Rothrock et al. ..... 524/312
2,666,752 1/1954 Grummitt et al. ..... 524/312
2,987,510 6/1961 Lederer et al. ..... 526/199
3,479,309 11/1969 Hecker et al. ..... 524/318
3,607,341 9/1971 Goins et al. ..... 428/314.2
3,624,051 11/1971 Bauer et al. ..... 526/216
4,130,527 12/1978 Miller et al. ..... 523/318
4,426,477 1/1984 Yasumatsu et al. ..... 524/306
4,481,324 11/1984 Hall et al. ..... 524/312

FOREIGN PATENT DOCUMENTS 55-3457 1/1980 Japan ..... 524/312

OTHER PUBLICATIONS

Henkel, Dehydran ® 131,240,520–Dehydran ® C,F,G; Dehydran ® P 10 (VP-BE 7566); Dusseldorf-ZR-FC Dehydag II KL; Jul. 1983 Edition (unsubstantiated); pp. 1–6.

Research Disclosures 15779 (May 1977) and 19516 (Jul. 1980).

*Primary Examiner*—Joseph L. Schofer
*Assistant Examiner*—N. Sarofim
*Attorney, Agent, or Firm*—Cushman, Darby & Cushman

[57] ABSTRACT

Treatment of aqueous suspensions of vinyl chloride polymers containing vinyl chloride monomer so as to inhibit wet-foaming therein, by adding a glyceride of an optionally substituted saturated or unsaturated carboxylic acid containing 6 to 20 carbon atoms (e.g. glycerol monoricinoleate). Solid-foaming can also be inhibited by adding a wetting agent (such as partially hydrolysed polyvinyl acetate PVA) and a preferred formulation for effecting the treatment comprises an aqueous emulsion of the glyceride having PVA as the emulsion stabilizer.

12 Claims, No Drawings

TREATMENT OF AQUEOUS SUSPENSION OF VINYL CHLORIDE POLYMERS

Matter enclosed in heavy brackets [ ] appears in the original patent but forms no part of this reissue specification; matter printed in italics indicates the additions made by reissue.

The present invention relates to a method of treating an aqueous suspension of a vinyl chloride polymer to inhibit foaming, and to an aqueous emulsion formulation for use in said treatment.

Vinyl chloride polymers, by which are meant vinyl chloride homopolymers and copolymers, may be produced by suspension polymerisation at moderately elevated temperatures, optionally under reflux (using direct or externally mounted condensers) to provide additional cooling capacity. The suspension product is subject to a number of operations to remove residual vinyl chloride, since, in view of the toxic nature of this substance, it is now recognized that vinyl chloride polymers should contain as little residual vinyl chloride monomer as is possible. Residual vinyl chloride may be largely removed by conventional venting, and optional pressure reduction, following by stripping (e.g. using steam) the suspension (not necessarily in the polymerisation reactor) to remove most of the residual vinyl chloride.

It has been found that such polymerisation under reflux and in any case each of the above-mentioned operations for removing vinyl chloride often results in the formation of 'wet-foam' and 'solid foam'. The wet-foam is what is conventionally considered as ordinary foam, namely an agglomeration of finely divided gas bubbles dispersed in a liquid (in this case water) and containing no or very little solid material. The dry-foam is a floating 'cream' of vinyl chloride polymer which comprises dense polymer particles made buoyant as a result of attached vinyl chloride gas bubbles. This cream, or 'solid-foam', is liable to be carried over into the condenser (if used) or into the lines of the venting/-pressure reduction system or stripping equipment causing blocked condensers or pipelines, damaged equipment (such as vacuum pumps), unacceptable losses in polymer and contamination problems when grades are changed; the solid-foam also inhibits the most effective possible removal of residual vinyl chloride from the polymer with the equipment that is available. The solid-foaming problem during stripping is particularly serious and is exacerbated when stripping is carried out under reduced pressure.

Conventional anti-foam agents, while effective for inhibiting the wet-foaming, are substantially ineffective in reducing the solid-foaming.

It is disclosed in Research Disclosure 15779 (May 1977) that this solid-foaming problem may be overcome by adding a wetting agent for vinyl chloride polymers such as partially hydrolysed polyvinyl acetate (hereinafter termed PVA) to the suspension before the commencement of at least one of the aforementioned processes which cause solid-foaming, rather than by the uneconomic and often largely ineffective control of operational conditions (such as slow venting, using only slight pressure reduction, or using a very slow throughput of steam when stripping).

However, it is further disclosed in Research Disclosure 15779, that the use of PVA as described while preventing solid-foaming, can promote the formation of ordinary form, i.e. wet-foam containing no or very little solid material.

While conventional commercially available anti-foams may be used to inhibit this wet-foaming (and indeed it is disclosed in Research Disclosure 15779 to add such anti-foams during operations such as stripping to inhibit wet-foaming), their presence as residues in the product polymer often adversely affects one or more properties of the polymer so produced, e.g. heat stability, volume resistivity and powder flow. Moreover such conventional anti-foams are often difficult to disperse in water and are sometimes difficult to handle.

In contrast, it has been disclosed in Research Disclosure 19516 (July 1980) that plasticisers such as diisoctyl phthalate are effective anti-wet-foams when stripping vinyl chloride polymers. It is further disclosed in Research Disclosure 19516 that the plasticiser's effectiveness may be improved by using an aqueous dispersion of the plasticiser which includes a fatty acid ester, preferably a lower alkyl (C1 to C5) ester of a C8-20 saturated fatty acid such as ethyl palmitate. Unfortunately, however, we have found that such dispersions tend not to be storage stable.

I have now discovered a method for overcoming the problems of wet-foaming of an aqueous suspension of a vinyl chloride polymer, even if such wet-foaming is actively promoted by also treating the aqueous suspension for the purpose of inhibiting solid foaming, which method does not incur the disadvantageous effects resulting from the use of the conventional anti-foams and which can be effected using a storage-stable additive formulation.

According to a first aspect of the present invention there is provided a method of treating an aqueous suspension of a vinyl chloride polymer, produced by suspension polymerisation and containing vinyl chloride monomer, to inhibit wet-foaming therein, which method comprises adding to the suspension a glyceride of an optionally substituted saturated or unsaturated carboxylic acid containing 6 to 20 carbon atoms. (For the sake of clarity, it is here stated that it is the carboxylic acid that contains 6 to 20 carbon atoms).

The utility of glycerides as anti-foams to prevent wet-foaming is surprising; normally such materials are used as lubricants for vinyl chloride polymers. In one group of such glycerides each is a glyceride of an unsaturated carboxylic acid containing 6 to 20 carbon atoms. In another group each glyceride is a glyceride of an unsaturated or saturated carboxylic acid containing 14 to 20 carbon atoms. In a further group each is a monoglyceride of a saturated or unsaturated carboxylic acid containing 6 to 20 carbon atoms. The glyceride may be substituted or unsubstituted in the carboxylic acid component; if substituted the substituent is preferably at least one hydroxy or alkoxy group. The glyceride is preferably a monocarboxylate. Preferred examples of glycerides to employ are monocarboxylates derived from unsubstituted or hydroxy-substituted oleic acids; preferred examples of these are glycerol monoricinoleate and glycerol monooleate.

The glyceride may be added before, during or after the commencement of suspension polymerisation or at least one of the operations to release residual vinyl chloride described hereinbefore i.e. it may be added to prevent the formation of wet-foam and/or to remove it after its formation (and the term "inhibiting" is intended to embrace both the prevention of foaming and the destruction of foaming after its formation).

The glyceride does not adversely affect the polymer properties (e.g. heat stability, volume resistivity or powder flow) of the vinyl chloride polymer so formed. The glycerides are exceptionally convenient to handle. For example they may be added as a solution in an organic solvent such as methanol. More usually, however, they are added as an oil-in-water emulsion; such an emulsion may readily be obtained by water-dilution of a concentrate emulsion (probably a water-in-oil emulsion) of the water-immiscible glyceride which is stabilised with a water-soluble PVA or cellulosic compound; the concentrate may typically contain 10 to 60%, more preferably 25 to 55%, by weight (based on the total weight of emulsion) of glyceride and 3 to 20% by weight (based on the weight of glyceride) of water-soluble PVA or cellulosic compound. The concentrate is stable under a wide range of storage conditions, particularly where the organic phase remains liquid down to 0° C. so that it is unlikely to freeze and break the emulsion, and may be stored without any separation; it may be formed e.g. by employing a high shear mixer. The concentrate may be diluted with water to a very stable oil-in-water emulsion (which will not e.g. coagulate in the mix tank or addition lines) that is stabilised by the PVA or cellulosic derivative from the concentrate and contains e.g. 2 to 8% by weight of the glyceride (based on the total weight of emulsion, and 3 to 20% by weight of water-soluble PVA compound (based on the weight of glyceride) for use according to the invention.

The amount of glyceride to add in the method of the invention is not critical and the optimum quantity will depend on the scale employed. A typical range to us is 30 to 2000 parts per million (ppm) based on the weight of vinyl chloride polymer in the slurry, particularly 50 to 700 ppm.

In a second aspect of the present invention, the aqueous suspension in which wet-foaming is inhibited is one to which an anti-dry-foam, that is a wetting agent for vinyl chloride polymers, particularly a water-soluble PVA or cellulosic, is also added.

Thus, according to a second aspect of the present invention there is provided a method of treating an aqueous suspension of a vinyl chloride polymer, produced by suspension polymerisation and containing vinyl chloride monomer, to inhibit wet-foaming and dry-foaming therein, which method comprises adding to the suspension a wetting agent for vinyl chloride polymer and a glyceride of an optionally substituted saturated or unsaturated carboxylic acid containing 6 to 20 carbon atoms. The wetting agent for vinyl chloride may in particular be a water-soluble PVA or cellulosic compound (and if such a material is also used as the suspension stabiliser for the vinyl chloride polymerisation, it is to be understood that the material added to inhibit dry-foaming is additional to that used as the suspension stabiliser present from the start of polymerisation).

Suitable quantities of glyceride in this aspect of the invention are the same as those in the first aspect.

The wetting agent for vinyl chloride polymer, particularly a water-soluble PVA or cellulosic compound, is used to prevent solid-foaming substantially in the same manner as the use of PVA for this purpose described in Research Disclosure 15779.

Where the anti-wet-foam of the first aspect of the present invention is in the form of an emulsion stabilised with a water-soluble PVA or cellulosic compound and obtainable from a concentrate emulsion (as described hereinbefore), the PVA or cellulosic compound stabilising the emulsion may itself be also employed as a wetting agent for inhibiting solid-foaming. Accordingly in such an embodiment, the PVA- or cellulosic-stabilised emulsion of the glyceride inhibits both solid-foaming and wet-foaming—although of course the emulsion must be added at an appropriate stage in the solid-foam-forming operation, viz before or just after a solid form starts to form so that solid-foaming is substantially inhibited. Alternatively such an emulsion may augment or be additional to wetting agent added to prevent solid-foaming, in which case it need not necessarily be added before or just after solid-foam formation.

Accordingly, there is further provided according to the invention a concentrate aqueous emulsion formulation for use, after dilution, in inhibiting wet- and dry-foaming in an aqueous suspension of a vinyl chloride polymer produced by aqueous suspension polymerisation and containing vinyl chloride monomer, which concentrate aqueous emulsion formulation comprises a glyceride of an optionally substituted carboxylic acid for inhibiting wet-foaming and a water-soluble PVA or cellulosic derivative serving as the emulsion stabiliser and also for inhibiting dry-foaming.

There is yet further provided according to the invention an aqueous emulsion formulation for use, without dilution, in inhibiting wet- and dry-foaming in an aqueous suspension of a vinyl chloride polymer produced by aqueous suspension and containing vinyl chloride monomer, which aqueous emulsion formulation comprises a glyceride of an optionally substituted carboxylic acid for inhibiting wet-foaming and a water-soluble PVA or cellulosic derivative serving as the emulsion stabiliser and also for inhibiting dry-foaming.

The amount of wetting agent to employ in the method of the invention is not critical and the optimum quantity will depend upon the scale employed. A typical range to use is 30–400 ppm based on the weight of vinyl chloride polymer in the slurry, preferably 50–250 ppm. The wetting agent, if not also used as the stabiliser for an emulsion containing glyceride is conveniently injected as a dilute aqueous solution. Mixtures of various wetting agents may also be employed.

A water-soluble PVA if used in the method of the invention may have any suitable degree of hydrolysis and the optimum molar degree of hydrolysis for the particular polymerisation system being employed should be determined by experiment. For example, the molar degree of hydrolysis could be from 65 to 90%, often from 70 to 85% and particularly about 72 to 73%. Typical cellulosic compounds if used are methyl cellulose, carboxymethyl cellulose and hydroxyethyl cellulose.

The polymerisation process for the production of vinyl chloride polymer in aqueous suspension may be conventional and any suitable free-radical monomer-soluble initiator or a combination of initiators may be used in the method of the invention. Suitable initiators include acyl peroxides such as lauroyl peroxide and acetyl cyclohexyl sulphonyl peroxide, azo compounds such as azodiisobutyronitrile and 2,2'-azo-bis-2,4-dimethylvaleronitrile, and dialkyl peroxidicarbonates such as diethyl peroxydicarbonate, diisopropyl peroxydicarbonate, di-t.butyl cyclohexyl peroxydicarbonate and dicetyl peroxydicarbonate. Any suitable suspension agent may be used; typical ones include protective colloids such as cellulose derivatives and partially hydrolysed polyvinyl acetates.

The present invention is illustrated by the following examples. Unless otherwise specified all parts and percentages are by weight.

EXAMPLE 1

An unstripped slurry of a granular PVC homopolymer was prepared conventionally (polymerisation temperature 58° C.; non reflux conditions).

To about 2 liters of the cold slurry was added 8 ml of a 4% aqueous solution of PVA of molar degree of hydrolysis 72% and the slurry transferred to a small steam stripping vessel suitable for laboratory scale evaluations. This vessel consisted of a glass cylinder (4.5 liter in volume) equipped with a stirrer at its base (to prevent the PVC suspension settling) and having three entry ports near its base: one for a thermometer, the second to inject stream into the slurry, and the third to drain slurry from the vessel after the termination of stripping. With the stirrer operating the slurry was charged to the stripping vessel via a charge funnel (closable to atmosphere) at the top of the cylinder. The slurry was heated up by injecting steam from a steam generator into the slurry. No solid-foaming was observed (in comparative runs without the addition of the PVA, the evolution of vinyl chloride gas caused solid foaming between 50° and 80° C.) but wet-foaming occurred when the slurry temperature rose to above 50° C.; this was destroyed by the injection of a methanolic solution of 1000 parts per million (ppm) of glycerol monoricinoleate through the charge funnel, the additive precipitating as fine particles so as to be uniformly dispersed in the slurry. The vinyl chloride gas evolved was vented to a fume cupboard via a condenser, the monomer take-off line also branching to a separating funnel for the collection of an solids carry over. Heating was continued until the slurry started to boil at 100° C.

The resulting polymer (after drying) was found to have a volume resistivity (VR) of 114 ohm cm (as measured according to BS 2782, Method 202A) as compared to a value of 113 ohm cm for the same polymer stripped without the antifoam addition. The thermal stability of the polymer (using various tests) was also virtually the same as that of control polymer stripped without the antifoam. Using another sample of vinyl chloride polymer (taken from a different batch) and 600 ppm of injected glycerol monoricinoleate, a VR of 176 ohm cm was achieved as compared to a VR of 160 ohm cm for the same polymer stripped without the addition of the antifoam.

By contrast, the use of several commercially available antifoams in place of the glycerol monoricinoleate (injected as bought from the manufacturer) caused a significant and unacceptable lowering of VR in the resulting polymer. Also some commercially available antifoams were found to be poorly dispersible in water leading to a less effective avoidance of wet-foam.

EXAMPLE 2

An aqueous-based concentrate emulsion formulation of glycerol monoricinoleate was prepared by adding 80 g of the material to 120 g of a 10% aqueous solution of PVA (molar degree of hydrolysis 72%) with vigorous stirring using a high shear mixer. The concentrate emulsion formuation was thus a mixture of 40% by weight glycerol monoricinoleate (based on the total weight of emulsion) and 60% by weight of the aqueous PVA solution (based on the total weight of emulsion and corresponding to 15% by weight of PVA based on the weight of glyceride), and had the appearance of a thick white cream (probably from its appearance a water in oil emulsion). The concentrate formulation was stored in jars and showed no sign of instability after 3 months in the laboratory. Samples of antifoam for evaluation could be readily prepared simply by diluting samples of the concentrate with water using mild stirring; for the following experiment 1 part of concentrate was diluted with 7 parts of water to give an oil-in water emulsion formulation of the glycerol monoricinoleate containing 5% by weight of glyceride (based on the total weight of emulsion). The diluted concentrate was quite stable and could be left for several days without stirring.

A sample of the antifoam (diluted concentrate prepared as described above) was evaluated using the stripping technique described in Example 1 with a slurry of a vinyl chloride homopolymer (polymerisation temperature 66° C.; non reflux conditions) and with an aqueous solution of PVA again being added to the cold slurry before stripping to inhibit dry-foaming. 500 ppm of glycerol monoricinoleate (and correspondingly 75 ppm of PVA) (based on vinyl chloride polymer) contained in the added diluted concentrate were used. Effective prevention of dry-foaming and destruction of wet-foaming was achieved without any adverse effect on volume resistivity and thermal stability.

EXAMPLE 3

The antifoam prepared as described in Example 2 (diluted concentrate), but on a larger scale, was evaluated when stripping slurries obtained from a variety of plant-scale vinyl chloride homo- and copolymerisations prepared using various polymerisation temperatures (55° C. to 72° C.; non-reflux conditions) and PVA (molar degree of hydrolysis 72%) as suspension agent. Various levels of antifoam were employed (varying from 30 to 600 ppm of glycerol monoricinoleate based on vinyl chloride polymer), and the formation of wet-foam was always destroyed or prevented by the addition of an appropriate amount of antifoam. Solid foaming was also prevented (aqueous PVA solution again having been injected before stripping) and there was no adverse effect on volume resistivity, thermal stability, and powder flow.

EXAMPLE 4

This was again a laboratory scale experiment, this time to simulate the troublesome effect in vinyl chloride polymerisations carried out with a reflux condenser wherein there is often an unwelcome surge of solid-foaming around the time of pressure drop which rises up the autoclave into the condenser, causing the blockage of the latter. The equipment used was a cylindrical glass vessel (approx. volume 3 liters) surrounded by a cooling/heating water jacket and fitted at the top with a condenser, a top entry stirrer, and a sealable injection port, and at the bottom with a sintered glass base (No. 2 porosity) above a bottom opening connected by tubing to a cylinder of vinyl chloride. The method was to simulate the often excessive solid-foaming at pressure drop in a condenser-fitted reactor by adding unstripped PVC slurry to the vessel with the stirrer running, heating up the slurry using the water jacket, and when solid-foaming started to form and rise up the vessel, to bubble in vinyl chloride through the sinter (creating small bubbles of the gas) to further increase the solid-foaming.

This technique was used on 1 liter of an unstripped slurry of a granular PVC homopolymer (polymerisation temperature 57° C.) charged to the vessel. When the temperature reached about 50° C. vinyl chloride was bubbled in to cause severe dry-foaming which rose up and started to enter the condenser. The antifoam prepared as described in Example 2 (diluted concentrate) was then injected, a total of 300 ppm of glycerol monoricinoleate and correspondingly 45 ppm of PVA (based on dry polymer weight) being used. Not only was wet-foaming prevented but the severe dry-foaming was entirely destroyed.

Similar runs using a solution containing only PVA or other types of wetting agent, while preventing solid-foaming, did not prevent the formation of wet-foaming which in some cases was very severe.

I claim:

1. Method of treating an aqueous suspension of a vinyl chloride polymer, produced by aqueous suspension polymerisation and containing residual vinyl chloride monomer, to inhibit wet-foaming *and dry-foaming* therein, which method comprises adding to said aqueous suspension of a vinyl chloride polymer containing residual vinyl chloride monomer, a glyceride of a saturated or unsaturated carboxylic acid, containing 6 to 20 carbon atoms *to inhibit wet-foaming and a wetting agent to inhibit dry-foaming, and wherein said glyceride is added to the suspension in the form of an oil-in-water emulsion and wherein at least part of the wetting agent used to inhibit dry-foaming is a water-soluble PVA or cellulosic compound which additionally serves as an emulsion stabilizer for the oil-in-water emulsion of the glyceride that is added to the suspension.*

[2. Method of treating an aqueous suspension of a vinyl chloride polymer, produced by aqueous suspension polymerization and containing residual vinyl chloride monomer, to inhibit wet-foaming and dry-foaming therein, which method comprises adding to the aqueous suspension of polymer containing residual vinyl chloride monomer, a wetting agent for vinyl chloride polymer and a glyceride of a saturated or unsaturated carboxylic acid containing 6 to 20 carbon atoms.]

3. Method according to [either] claim 1 [or claim 2] wherein the carboxylic acid component of the glyceride is unsaturated.

4. Method according to claim 1 wherein the glyceride used is a glycerol monocarboxylate.

5. Method according to claim 1 wherein the carboxylic acid component of the glyceride used is unsubstituted or hydroxy substituted.

6. Method according to claim 1 wherein the glyceride used is glycerol monoricinoleate or glycerol monooleate.

[7. Method according to claim 1 wherein the glyceride is added to the suspension in the form of a solution in an organic solvent or in the form of an oil-in-water emulsion.]

8. Method according to claim 1 wherein 50 to 2000 parts per million, based on the weight of vinyl chloride polymer, of glyceride is added to the suspension.

[9. Method according to claim 2 wherein the wetting agent used is a water-soluble PVA or cellulosic compound.]

10. Method according to claim [2] *1* wherein the PVA has a molar degree of hydrolysis of 65 to 90%.

[11. Method according to claim 2 wherein at least part of the wetting agent used is a water-soluble PVA or cellulosic compound which additionally serves as an emulsion stabiliser for an oil-in-water emulsion of the glyceride that is added to the suspension.]

12. Method according to claim [2] *1* wherein 30 to 400 parts per million, based on the weight of vinyl chloride polymer, of wetting agent is added to the suspension.

* * * * *